(12) United States Patent
Takano et al.

(10) Patent No.: US 12,222,069 B2  
(45) Date of Patent: Feb. 11, 2025

(54) HIGH-PRESSURE HYDROGEN TANK

(71) Applicant: JFE STEEL CORPORATION, Tokyo (JP)

(72) Inventors: Toshio Takano, Tokyo (JP); Hiroshi Okano, Tokyo (JP); Akihide Nagao, Tokyo (JP); Nobuyuki Ishikawa, Tokyo (JP); Kazuki Matsubara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/287,683

(22) PCT Filed: Nov. 11, 2019

(86) PCT No.: PCT/JP2019/044094  
§ 371 (c)(1),  
(2) Date: Apr. 22, 2021

(87) PCT Pub. No.: WO2020/100800  
PCT Pub. Date: May 22, 2020

(65) Prior Publication Data  
US 2021/0396354 A1  Dec. 23, 2021

(30) Foreign Application Priority Data  
Nov. 12, 2018  (JP) .............................. 2018-212238

(51) Int. Cl.  
*F17C 1/04* (2006.01)  
*F16J 13/12* (2006.01)  
*F17C 1/06* (2006.01)

(52) U.S. Cl.  
CPC ................. *F17C 1/04* (2013.01); *F16J 13/12* (2013.01); *F17C 1/06* (2013.01);  
(Continued)

(58) Field of Classification Search  
CPC ............ F17C 2260/037; F17C 2260/04; F17C 2203/0682; F17C 1/04; F17C 2260/038; Y02E 60/32  
(Continued)

(56) References Cited

U.S. PATENT DOCUMENTS 3,460,710 A  *  8/1969  Vogeli ..................... F16J 13/02  
                                                            220/582  
3,489,309 A  1/1970  Berman et al.  
(Continued)

FOREIGN PATENT DOCUMENTS

DE         1178044 B      9/1964  
DE    102016208376 A1 * 11/2017  
(Continued)

OTHER PUBLICATIONS

Dec. 17, 2019 Search Report issued in International Patent Application No. PCT/JP2019/044094.  
(Continued)

*Primary Examiner* — Don M Anderson  
*Assistant Examiner* — Laura E. Parker  
(74) *Attorney, Agent, or Firm* — Oliff PLC (57) ABSTRACT

A high-pressure hydrogen tank includes a metal circular cylinder configured to store high-pressure hydrogen therein, a cap part configured to cover each of opposite end portions of the metal circular cylinder, an outer cylinder surrounding an outer periphery of a circular-cylindrical portion of the metal circular cylinder, and a fastening part configured to fix the cap part to the outer cylinder.

14 Claims, 4 Drawing Sheets

(52) U.S. Cl.
CPC .............. *F17C 2201/0119* (2013.01); *F17C 2201/0157* (2013.01); *F17C 2203/0629* (2013.01); *F17C 2203/0639* (2013.01); *F17C 2209/228* (2013.01); *F17C 2221/012* (2013.01); *F17C 2260/037* (2013.01); *F17C 2260/038* (2013.01); *F17C 2270/0168* (2013.01)

(58) Field of Classification Search
USPC ........................................................ 220/581
See application file for complete search history.

(56) References Cited

U.S. PATENT DOCUMENTS

| | | | |
|---|---|---|---|
| 2004/0182869 | A1 | 9/2004 | Kubo et al. |
| 2007/0056976 | A1* | 3/2007 | Kubusch ............... B60L 58/30 220/581 |
| 2008/0164251 | A1* | 7/2008 | Fawley ............... B65D 88/128 414/800 |
| 2010/0126999 | A1* | 5/2010 | Kleber ................... F17C 1/14 220/582 |
| 2010/0181324 | A1* | 7/2010 | Morinaga ............... F16J 13/02 277/650 |
| 2011/0315692 | A1* | 12/2011 | Svensson ................. F17C 1/00 220/581 |
| 2015/0165461 | A1* | 6/2015 | Mizuki ................... B05B 11/00 220/581 |
| 2019/0277446 | A1* | 9/2019 | Ogiwara ............... F17C 13/025 |
| 2020/0240587 | A1* | 7/2020 | Ogiwara ........... H01M 8/04776 |

FOREIGN PATENT DOCUMENTS

| | | | | |
|---|---|---|---|---|
| JP | S48-90 | B1 | 1/1973 | |
| JP | S50-16504 | U | 2/1975 | |
| JP | S62-113967 | A | 5/1987 | |
| JP | H02-200522 | A | 8/1990 | |
| JP | 2003-065437 | A | 3/2003 | |
| JP | 2009-243660 | A | 10/2009 | |
| JP | 5071801 | B2 | 11/2012 | |
| JP | 2016-089891 | A | 5/2016 | |
| JP | 2016-183687 | A | 10/2016 | |
| JP | 6120017 | B2 | 4/2017 | |
| JP | 2019113121 | A * | 7/2019 | |
| WO | WO-0246654 | A1 * | 6/2002 | .............. F16L 9/147 |

OTHER PUBLICATIONS

May 25, 2021 Office Action issued in Japanese Patent Application No. 2020-536695.
Feb. 7, 2022 Extended European Search Report issued in Patent Application No. 19884261.9.
Feb. 18, 2022 Examination Report issued in Indian Patent Application No. 202117021093.
Feb. 28, 2022 Office Action issued in Chinese Patent Application No. 201980070437.3.
Nov. 7, 2022 Office Action issued in Korean Patent Application No. 10-2021-7012280.
Feb. 24, 2023 Office Action issued in Korean Patent Application No. 10-2021-7012280.
Jan. 25, 2024 Hearing Notice issued in Indian Patent Application No. 202117021093.

* cited by examiner

HIGH-PRESSURE HYDROGEN TANK

TECHNICAL FIELD

The present disclosure relates to a high-pressure hydrogen tank configured to store high-pressure hydrogen therein.

BACKGROUND ART

For fuel-cell type transportation vehicles, a technique of using a high-pressure hydrogen tank has been disclosed, in which an inlet/outlet port for high-pressure hydrogen is provided at the top of a dome-shaped portion provided at one end of a circular-cylindrical portion (see, for example, Patent Literature 1).

CITATION LIST

Patent Literature
Patent Literature 1: Japanese Patent Publication No. 6120017

SUMMARY OF INVENTION

Technical Problem

However, in the technique disclosed in Patent Literature 1, a repeated pressure cycle of high-pressure hydrogen is assumed to be present during use of the high-pressure hydrogen tank mounted on a transportation vehicle. Thus, a thick circular-cylindrical portion is used as a body portion of the high-pressure hydrogen tank to reduce the stress level, and a dome-shaped portion is formed at one end of the thick circular-cylindrical portion. Due to this configuration, a longer time and much effort are required to produce a safe high-pressure hydrogen tank. This leads to a problem that the production costs increase.

The present disclosure has been achieved to solve the above-mentioned problems, and an object thereof is to provide a high-pressure hydrogen tank having a simple configuration without requiring a longer time and much effort in production, while being safe and able to reduce production costs.

Solution to Problem

[1]
A high-pressure hydrogen tank according of an embodiment of the present disclosure includes: a metal circular cylinder configured to store high-pressure hydrogen therein; a cap part configured to cover each of opposite end portions of the metal circular cylinder; an outer cylinder surrounding an outer periphery of a circular-cylindrical portion of the metal circular cylinder; and a fastening part configured to fix the cap part to the outer cylinder.

[2]
In the high-pressure hydrogen tank of [1], a bolt is used as the fastening part.

[3]
In the high-pressure hydrogen tank of [2], the bolt is inserted from the cap part into the outer cylinder, and the cap part is formed with a recessed portion in which a head portion of the bolt is accommodated.

[4]
In the high-pressure hydrogen tank of any one of [1] to [3], between an outer periphery of the metal circular cylinder and an inner periphery of the outer cylinder, a gap is formed by which the metal circular cylinder and the outer cylinder are spaced apart from each other.

[5]
In the high-pressure hydrogen tank of [4], the outer cylinder is formed with a flow path passing from the gap to an outside on an outer peripheral side of the outer cylinder.

[6]
In the high-pressure hydrogen tank of any one of [1] to [5], the high-pressure hydrogen tank has a first fitting structure to fit the metal circular cylinder and the cap part to each other.

[7]
In the high-pressure hydrogen tank of [6], a sealing part is provided between the metal circular cylinder and the cap part on an inner-diameter side relative to the first fitting structure.

[8]
In the high-pressure hydrogen tank of any one of [1] to [7], the high-pressure hydrogen tank has a second fitting structure to fit the outer cylinder and the cap part to each other.

[9]
In the high-pressure hydrogen tank of [8], the second fitting structure is provided at a fastening portion of the fastening part.

[10]
In the high-pressure hydrogen tank of any one of [1] to [9], the outer cylinder includes a flat lower surface.

[11]
In the high-pressure hydrogen tank of any one of [1] to [10], the outer cylinder is an outer square cylinder with a square-cylindrical shape.

[12]
In the high-pressure hydrogen tank of any one of [1] to [9], the outer cylinder is an outer circular cylinder with a circular-cylindrical shape.

[13]
In the high-pressure hydrogen tank of any one of [1] to [12], the high-pressure hydrogen tank serves as a part of a counterweight of a transportation vehicle.

Advantageous Effects of Invention

According of the high-pressure hydrogen tank of an embodiment of the present disclosure, the cap part is fixed to the outer circular cylinder by the fastening part. With this configuration, the high-pressure hydrogen tank can be produced by fixing the cap part configured to cover each of the opposite end portions of the metal circular cylinder to the outer circular cylinder surrounding the outer periphery of the circular-cylindrical portion of the metal circular cylinder by using the fastening part. Therefore, the high-pressure hydrogen tank having a simple configuration without requiring a longer time and much effort in production, while being safe and able to reduce production costs, can be provided.

DESCRIPTION OF EMBODIMENTS

A preferred embodiment of an accumulator of the present disclosure will be described hereinafter in detail with reference to the drawings. Note that the embodiment described below is a preferred specific example of the present disclosure, and thus various technically preferable limitations are described. However, the scope of the present disclosure is not particularly limited to these embodiments unless otherwise specified in the following descriptions.

Configuration of Forklift 100

Figure 1:
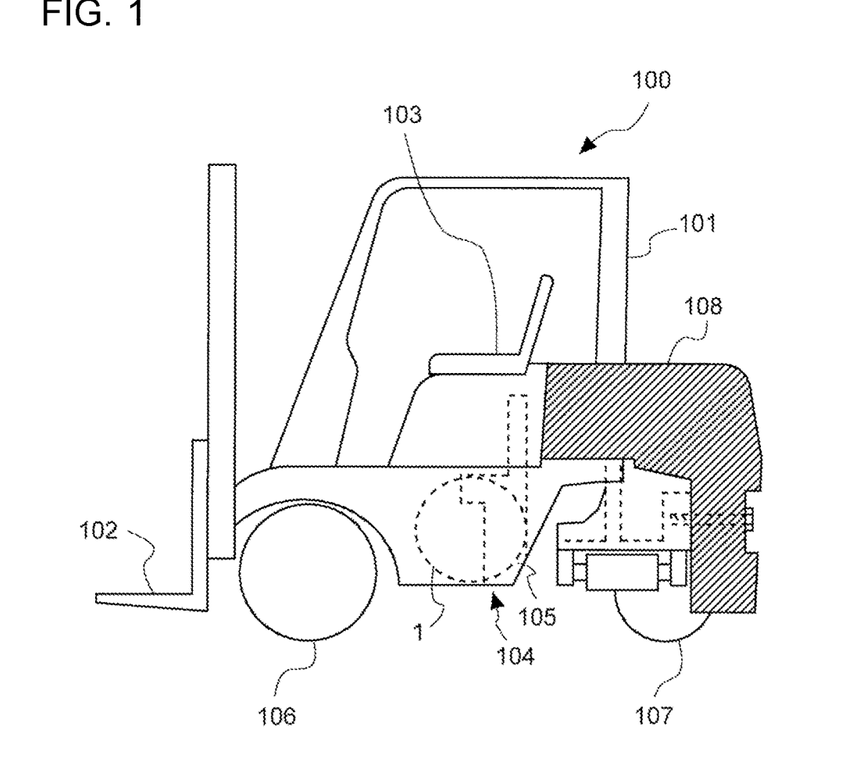
FIG. 1 is a schematic configuration diagram illustrating a forklift according to Embodiment of the present disclosure.

FIG. 1 is a schematic configuration diagram illustrating a forklift 100 according to Embodiment of the present disclosure. The forklift 100 illustrated in FIG. 1 is a fuel-cell type transportation vehicle. The forklift 100 includes a loading device 102 at the front portion of a vehicle body 101. The forklift 100 includes a driver's seat 103 at the central portion of the vehicle body 101.

The forklift 100 includes a fuel cell 104 below the driver's seat 103. The fuel cell 104 includes a power generation unit 105 and a high-pressure hydrogen tank 1. The power generation unit 105 initiates a chemical reaction between oxygen in the air and hydrogen supplied from the high-pressure hydrogen tank 1 to generate electric power.

The forklift 100 includes a pair of front wheels 106 that are drive wheels at the front portion of the vehicle body 101, and a pair of rear wheels 107 that are steering wheels at the rear portion of the vehicle body 101. The pair of front wheels 106 is driven by an electric motor (not illustrated). The electric motor is supplied with electric power from the power generation unit 105. The pair of rear wheels 107 is steered by a driver seated on the driver's seat 103.

The forklift 100 includes a counterweight 108 at the rear portion of the vehicle body 101. The counterweight 108 is designed to adjust the vehicle weight and keep the weight balance of the vehicle body 101. The forklift 100 does not include a counterweight at the front portion of the vehicle body 101. The high-pressure hydrogen tank 1 provided at the central portion of the vehicle body 101 of the forklift 100 has a weight appropriate to assist the counterweight 108. That is, the high-pressure hydrogen tank 1 serves as a part of the counterweight of the forklift 100. Due to this configuration, the fuel cell 104 is accommodated in a case (not illustrated) that is lightweight and easily machined. The case does not serve as a part of the counterweight.

Other Transportation Vehicles

As described above, the high-pressure hydrogen tank 1 is used in the forklift 100. However, the high-pressure hydrogen tank 1 is not limited to being used in the forklift 100. The high-pressure hydrogen tank 1 is also used in other transportation vehicles. Examples of the transportation vehicles may include a towing car that is used at an airport or other places.

Configuration of High-Pressure Hydrogen Tank 1

Figure 2:
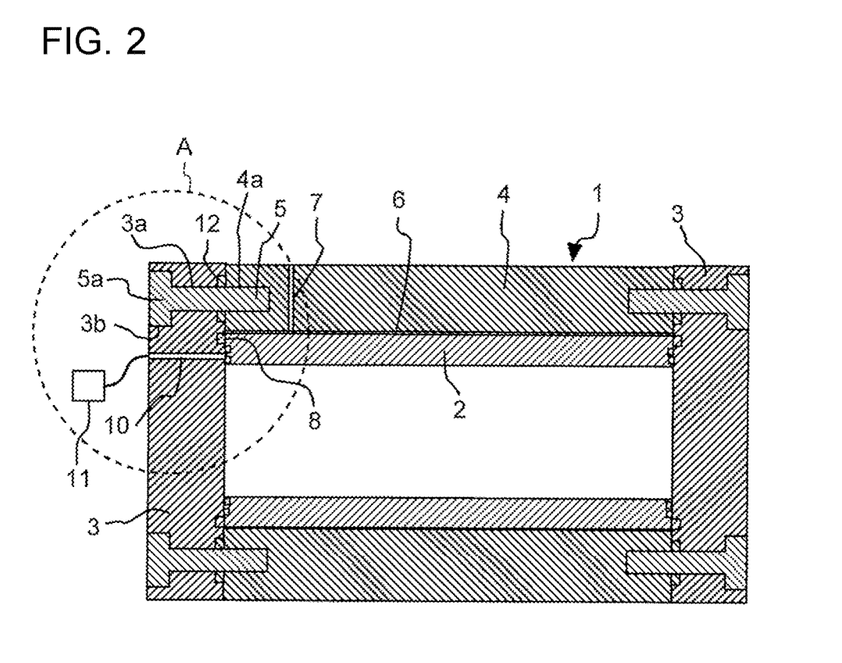
FIG. 2 is an explanatory view of a high-pressure hydrogen tank according to Embodiment of the present disclosure in cross-section taken along the extending direction of a metal circular cylinder and an outer cylinder of the high-pressure hydrogen tank.

FIG. 2 is an explanatory view of the high-pressure hydrogen tank 1 according to Embodiment of the present disclosure in cross-section taken along the extending direction of a metal circular cylinder 2 and an outer cylinder 4 of the high-pressure hydrogen tank 1. The high-pressure hydrogen tank 1 illustrated in FIG. 2 stores high-pressure hydrogen therein. The high-pressure hydrogen tank 1 includes the metal circular cylinder 2, a cap part 3, and the outer cylinder 4. The cap part 3 is fixed to the outer cylinder 4 by a bolt 5 that is a fastening part. The fixing is conducted by bolts 5 at plural locations on the same circumference at regular intervals. The outer cylinder 4 is an example of the outer cylinder. An outer circular cylinder with a circular-cylindrical shape is used as the outer cylinder 4.

Metal Circular Cylinder 2

The metal circular cylinder 2 is a circular-cylindrical part with its opposite end portions opened, and configured to store high-pressure hydrogen therein. The metal circular cylinder 2 is made up of a seamless circular-cylindrical part made of metal to prevent leakage of high-pressure hydrogen stored therein.

The metal circular cylinder 2 is made of, for example, low-alloy steel. That is, the metal circular cylinder 2 is made of a material including, for example, any one of chrome molybdenum steel, nickel-chrome molybdenum steel, manganese chrome steel, manganese steel, and boron steel.

On an inner peripheral surface of the metal circular cylinder 2, a decarburized layer has been removed. On the inner peripheral surface of the metal circular cylinder 2 after removal of the decarburized layer, a residual compressive stress is applied to the inner surface by blasting shot balls with a relatively large mass.

Note that a carbon fiber-reinforced resin portion may be wound around the outer periphery of the metal circular cylinder 2. The carbon fiber-reinforced resin portion is provided to ensure a mechanical strength, which is a resistance to pressure, required for the metal circular cylinder 2. The carbon fiber-reinforced resin portion is a composite material in which carbon fiber is used as a reinforcement and is soaked with resin to improve the strength. For example, PAN-based carbon fiber or PITCH-based carbon fiber is used.

Cap Part 3

The cap part 3 is attached to each of the opposite end portions of the metal circular cylinder 2 to cover each of the opposite end portions of the metal circular cylinder 2 to close the metal circular cylinder 2. A pair of cap parts 3 is a disc-like part. At least one of the cap parts 3 is provided with a valve (not illustrated) connecting to a hydrogen passage hole (not illustrated). The valve is used to fill or discharge high-pressure hydrogen. The pair of cap parts 3 is made of metal similarly to the metal circular cylinder 2.

The pair of cap parts 3 is formed with a plurality of insertion holes 3a through which the bolts 5 are inserted. Each of the insertion holes 3a in the cap parts 3 is formed with a recessed portion 3b in which a head portion 5a of the bolt 5 is accommodated. Note that the recessed portion 3b may not be formed. In a case where there is not the recessed portion 3b, the head portion 5a of the bolt 5 protrudes outward from the cap part 3.

Outer Cylinder 4

The outer cylinder 4 is a circular-cylindrical part opened at its opposite end portions, and surrounding the outer periphery of the circular-cylindrical portion of the metal circular cylinder 2. The outer cylinder 4 may be a seamed circular-cylindrical part made of metal, such as a welded pipe, such that the production costs are reduced. The outer cylinder 4 is made of metal that is lower-cost steel material than the material of the metal circular cylinder 2. It is preferable that the outer cylinder 4 be made of material with a density equal to or greater than the density of the material of the metal circular cylinder 2.

The outer cylinder 4 is formed with a screw hole 4a into which the bolt 5 is screwed. The bolt 5 is inserted from the cap part 3 into the outer cylinder 4 and screwed into the screw hole 4a. The bolt 5 is screwed by inserting a tool such as a spanner between the recessed portion 3b of the cap part 3 and the head portion 5a of the bolt 5. The bolt 5 may have an insertion hole on the head portion 5a, into which a tool such as a hexagonal wrench is fitted to screw the bolt 5.

Gap 6 with Circular-Cylindrical Shape

Between the outer periphery of the metal circular cylinder 2 and the inner periphery of the outer cylinder 4, a gap 6 with a circular-cylindrical shape is provided so as to allow the metal circular cylinder 2 and the outer cylinder 4 to be spaced apart from each other. The gap 6 has a width of, for example, preferably 1 mm or greater, and more preferably 2 mm or greater in the radial direction. The metal circular cylinder 2 is in direct contact with high-pressure hydrogen stored therein, and thus the hydrogen permeates through the metal circular cylinder 2. However, the hydrogen escaping from the metal circular cylinder 2 accumulates in the gap 6, and does not permeate into the outer cylinder 4 separated from the metal circular cylinder 2 by the gap 6. Thus, the high-pressure hydrogen tank 1 prevents the occurrence of hydrogen degradation of the outer cylinder 4 and the bolts 5. The gap 6 is present between the outer periphery of the metal circular cylinder 2 and the inner periphery of the outer cylinder 4, so that even when the metal circular cylinder 2 becomes deformed in the circumferential direction by high-pressure hydrogen stored therein, the gap 6 prevents the deforming stress from being transmitted to the outer cylinder 4 and the bolts 5.

Details on Part of High-Pressure Hydrogen Tank 1

Figure 3:
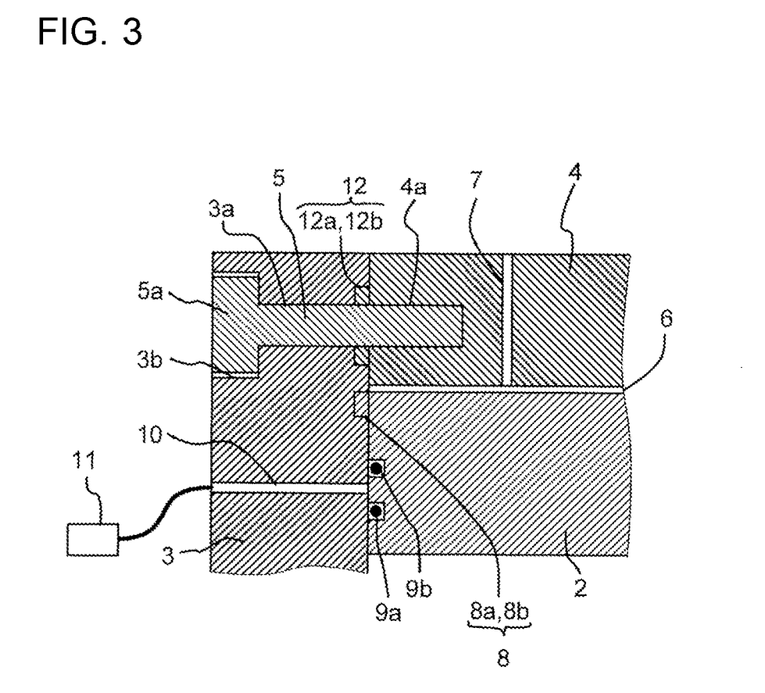
FIG. 3 is an enlarged view of a part of the high-pressure hydrogen tank according to Embodiment of the present disclosure, illustrated by enlarging an A portion in FIG. 2.

FIG. 3 is an enlarged view of a part of the high-pressure hydrogen tank 1 according to Embodiment of the present disclosure, illustrated by enlarging an A portion in FIG. 2. As illustrated in FIG. 3, it is desirable that the outer cylinder 4 is formed with a flow path 7 passing from the gap 6 to the outside on the outer peripheral side. The hydrogen having accumulated in the gap 6 flows through the flow path 7 to the outside, so that high-concentration hydrogen does not accumulate in the gap 6 and this can ensure the safety of the high-pressure hydrogen tank 1. Note that the flow path 7 may not be provided. One flow path 7 or a plurality of flow paths 7 may be provided.

The metal circular cylinder 2 and the cap part 3 are fitted to each other by a first fitting structure 8. The first fitting structure 8 is a structure to fit a projecting portion 8a into a recessed portion 8b. The projecting portion 8a is formed on the outer peripheral portion at each of the opposite end portions of the metal circular cylinder 2. The recessed portion 8b is formed on the inner surface of the cap part 3. The projecting portion 8a and the recessed portion 8b have an annular shape. There may be a plurality of projecting portions 8a located separately from each other on the same circumference, and correspondingly a plurality of recessed portions 8b located separately from each other on the same circumference. Note that the first fitting structure 8 may employ another form to fit the metal circular cylinder 2 and the cap part 3 to each other.

Between the metal circular cylinder 2 and the cap part 3 on the inner-diameter side relative to the first fitting structure 8, a first O-ring 9a and a second O-ring 9b are provided to serve as a sealing part. The first O-ring 9a is located on the inner peripheral side relative to the second O-ring 9b. The first O-ring 9a seals the gap between the metal circular cylinder 2 and the cap part 3. The second O-ring 9b is a sealing part in case of degradation of the first O-ring 9a and thus a leakage of hydrogen from the first O-ring 9a.

Between the first O-ring 9a and the second O-ring 9b, a leaked-hydrogen discharge hole 10 is formed through the cap part 3. The leaked-hydrogen discharge hole 10 passes through the cap part 3 to the outside on the outer side thereof. A hydrogen sensor 11 is provided at the exit of the leaked-hydrogen discharge hole 10. The hydrogen sensor 11 monitors leakage of hydrogen.

The outer cylinder 4 and the cap part 3 are fitted to each other by a second fitting structure 12. The second fitting structure 12 is a structure to fit a projecting portion 12a into a recessed portion 12b. The projecting portion 12a is formed on the central portion at each of the opposite end portions of the outer cylinder 4. The recessed portion 12b is formed on the inner surface of the cap part 3. The projecting portion 12a and the recessed portion 12b have an annular shape. There may be a plurality of projecting portions 12a located separately from each other on the same circumference, and correspondingly a plurality of recessed portions 12b located separately from each other on the same circumference. Note that the second fitting structure 12 may employ another form to fit the outer cylinder 4 and the cap part 3 to each other.

The second fitting structure 12 is provided at the fastening portion of the bolt 5. The outer cylinder 4 and the cap part 3 are fastened by the bolt 5 at a portion where the outer cylinder 4 is assembled with the cap part 3 by precise positioning due to the second fitting structure 12.

Modification 1

Figure 4:
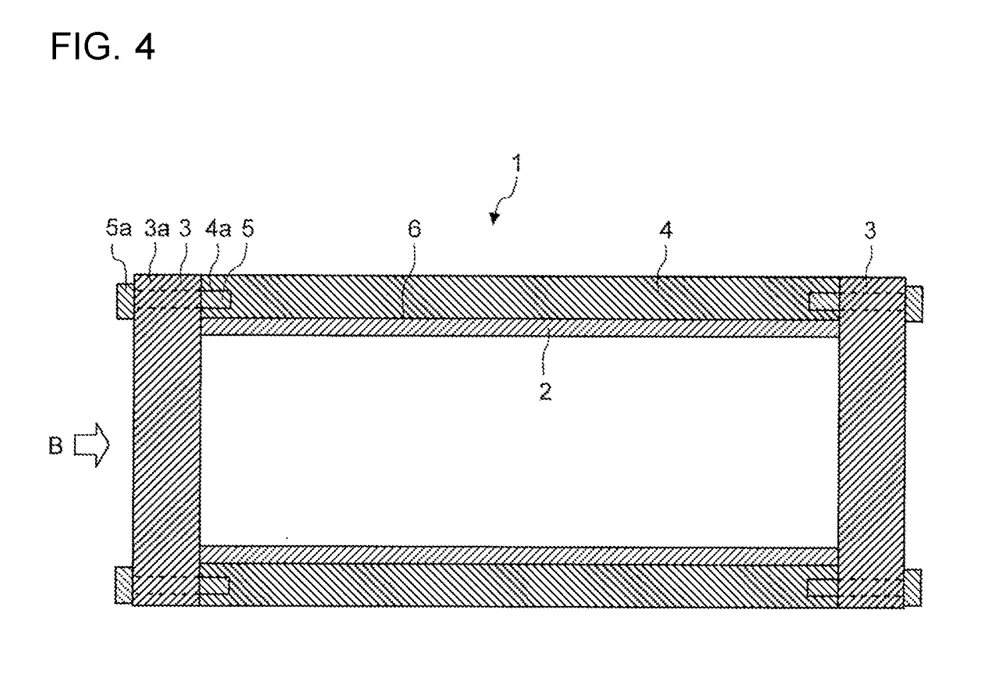
FIG. 4 is an explanatory view of the high-pressure hydrogen tank according to Modification 1 of Embodiment of the present disclosure in cross-section taken along the extending direction of the metal circular cylinder and the outer cylinder of the high-pressure hydrogen tank.
Figure 5:
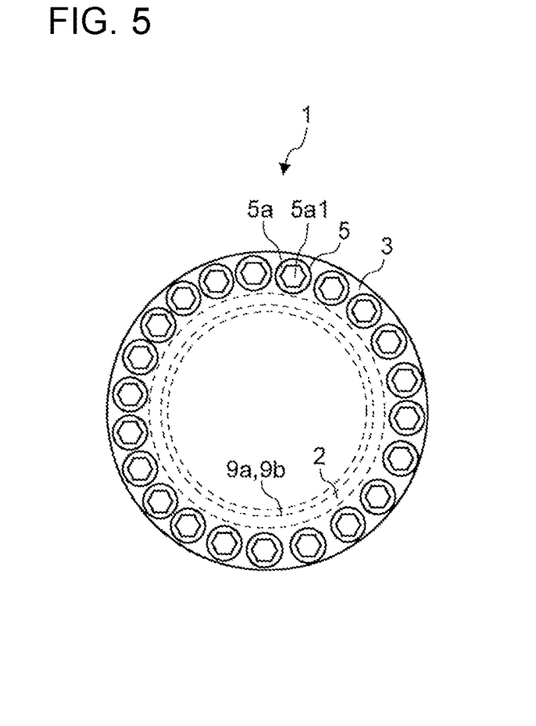
FIG. 5 is a side view of the high-pressure hydrogen tank according to Modification 1 of Embodiment of the present disclosure when viewed from the direction of an arrow B in FIG. 4.

FIG. 4 is an explanatory view of the high-pressure hydrogen tank 1 according to Modification 1 of Embodiment of the present disclosure in cross-section taken along the extending direction of the metal circular cylinder 2 and the outer cylinder 4 of the high-pressure hydrogen tank 1. FIG. 5 is a side view of the high-pressure hydrogen tank 1 according to Modification 1 of Embodiment of the present disclosure when viewed from the direction of an arrow B in FIG. 4. Descriptions of similar components as those according to Embodiment described above are omitted, and only the characteristic portions are hereinafter described.

As illustrated in FIGS. 4 and 5, the insertion hole 3a of the cap part 3 is not formed with a recessed portion in which the head portion 5a of the bolt 5 is accommodated. The head portion 5a of the bolt 5 protrudes outward from the cap part 3. The bolt 5 has an insertion hole 5a1 on the head portion 5a, into which a tool such as a hexagonal wrench is fitted to screw the bolt 5.

Modification 2

Figure 6:
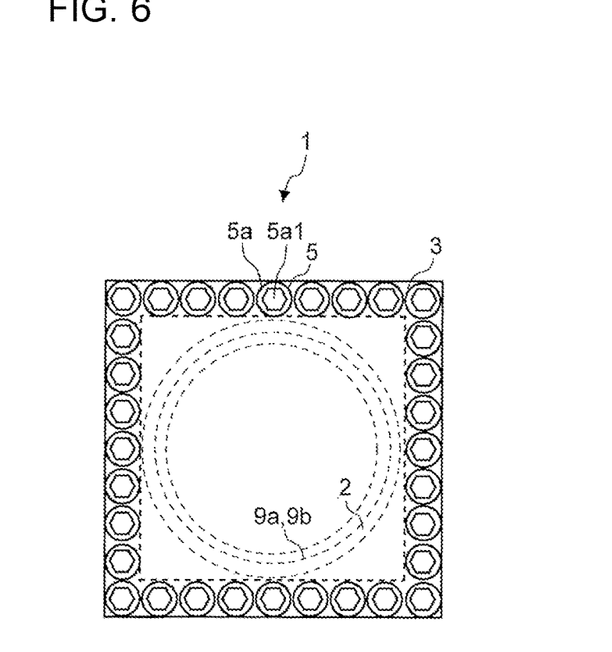
FIG. 6 is a side view of the high-pressure hydrogen tank according to Modification 2 of Embodiment of the present disclosure when viewed from the direction of the arrow B in FIG. 4.
Figure 7:
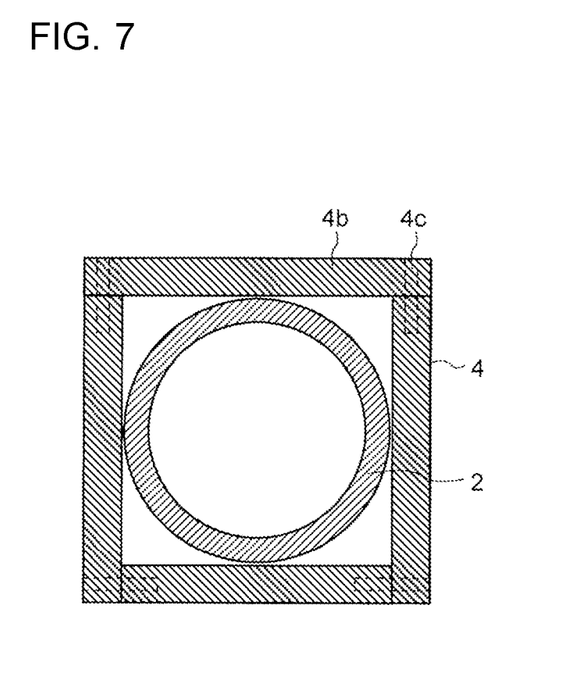
FIG. 7 is an explanatory view of the metal circular cylinder and the outer cylinder of the high-pressure hydrogen tank according to Modification 2 of Embodiment of the present disclosure in cross-section viewed from the direction of the arrow B in FIG. 4.

FIG. 6 is a side view of the high-pressure hydrogen tank 1 according to Modification 2 of Embodiment of the present disclosure when viewed from the direction of the arrow B in FIG. 4. FIG. 7 is an explanatory view of the metal circular cylinder 2 and the outer cylinder 4 of the high-pressure hydrogen tank 1 according to Modification 2 of Embodiment of the present disclosure in cross-section viewed from the direction of the arrow B in FIG. 4. Descriptions of similar components as those according to Embodiment described above are omitted, and only the characteristic portions are hereinafter described.

As illustrated in FIG. 6, the cap part 3 includes a flat lower surface. The cap part 3 is a plate-like part. The outer cylinder 4 also includes a flat lower surface similarly to the cap part 3 illustrated in FIG. 6. As illustrated in FIG. 7, the outer cylinder 4 is an outer square cylinder with a square-cylindrical shape and having four sides of an identical shape according to the outer peripheral shape of the cap part 3. The outer cylinder 4 is formed by combining four plate-like parts 4b. Fixing parts such as bolts 4c are used to fix the four plate-like parts 4b to each other.

Note that the outer cylinder 4 may have a shape with a flat lower surface differently from the shape of the outer square cylinder. For example, the outer cylinder 4 may be a cylindrical part with a U-shape, a truncated conical shape, or a polygonal shape such as a truncated square pyramid shape. In this case, it suffices that the cap part 3 is a plate-like part with a shape according to the outer peripheral shape of the outer cylinder 4.

Effects of Embodiment

According to Embodiment, the high-pressure hydrogen tank 1 includes the metal circular cylinder 2 configured to store high-pressure hydrogen therein. The high-pressure hydrogen tank 1 includes the cap part 3 configured to cover each of the opposite end portions of the metal circular cylinder 2. The high-pressure hydrogen tank 1 includes the outer cylinder 4 surrounding the outer periphery of the circular-cylindrical portion of the metal circular cylinder 2. The high-pressure hydrogen tank 1 includes the fastening part configured to fix the cap part 3 to the outer cylinder 4.

With this configuration, the high-pressure hydrogen tank 1 can be produced by fixing the cap part 3 configured to cover each of the opposite end portions of the metal circular cylinder 2 to the outer cylinder 4 surrounding the outer periphery of the circular-cylindrical portion of the metal circular cylinder 2 by using the bolts 5 that are the fastening parts. Therefore, the high-pressure hydrogen tank 1 having a simple configuration without requiring much time and effort to produce, while being safe and able to reduce production costs, can be provided.

According to Embodiment, the bolt 5 is used as the fastening part.

With this configuration, the high-pressure hydrogen tank 1 can be produced by fixing the cap part 3 configured to cover each of the opposite end portions of the metal circular cylinder 2 to the outer cylinder 4 surrounding the outer periphery of the circular-cylindrical portion of the metal circular cylinder 2 by using the bolts 5.

According to Embodiment, the bolt 5 is inserted from the cap part 3 into the outer cylinder 4. The cap part 3 is formed with the recessed portion 3b in which the head portion 5a of the bolt 5 is accommodated.

With this configuration, the bolts 5 do not protrude from the opposite end portions of the high-pressure hydrogen tank 1, and the circular-cylindrical portion of the high-pressure hydrogen tank 1 provided between the cap parts 3 can be maximized in size within a limited installation space, so that the amount of high-pressure hydrogen stored in the high-pressure hydrogen tank 1 can be increased. Particularly, it is effective for the high-pressure hydrogen tank 1 mounted in a transportation vehicle in that the size of the high-pressure hydrogen tank 1 can be maximized within the limited installation space of the vehicle.

According to Embodiment, between the outer periphery of the metal circular cylinder 2 and the inner periphery of the outer cylinder 4, the gap 6 with a circular-cylindrical shape is formed by which the metal circular cylinder 2 and the outer cylinder 4 are spaced apart from each other.

With this configuration, the metal circular cylinder 2 is in direct contact with high-pressure hydrogen stored therein, and thus the hydrogen permeates through the metal circular cylinder 2. However, the hydrogen escaping from the metal circular cylinder 2 accumulates in the gap 6, and does not permeate into the outer cylinder 4 separated from the metal circular cylinder 2 by the gap 6. Thus, the high-pressure hydrogen tank 1 is safe since the high-pressure hydrogen tank 1 prevents the occurrence of hydrogen degradation of the outer cylinder 4 and the bolts 5 that are the fastening parts. The gap 6 is present between the outer periphery of the metal circular cylinder 2 and the inner periphery of the outer cylinder 4, so that even when the metal circular cylinder 2 becomes deformed in the circumferential direction by high-pressure hydrogen stored therein, the gap 6 prevents the deforming stress from being transmitted to the outer cylinder 4 and the bolts 5 that are the fastening parts.

According to Embodiment, the outer cylinder 4 is formed with the flow path 7 passing from the gap 6 to the outside on the outer peripheral side of the outer cylinder 4.

With this configuration, hydrogen escaping from the metal circular cylinder 2 accumulates in the gap 6. The hydrogen having accumulated in the gap 6 flows through the flow path 7 to the outside, so that high-concentration hydrogen does not accumulate in the gap 6 and this can ensure the safety of the high-pressure hydrogen tank 1. This configuration also prevents the occurrence of hydrogen degradation of the outer cylinder 4 and the bolts 5 that are the fastening parts.

According to Embodiment, the high-pressure hydrogen tank 1 has the first fitting structure 8 to fit the metal circular cylinder 2 and the cap part 3 to each other.

With this configuration, the metal circular cylinder 2 that is not fixed to the cap part 3 with a fastening part or other parts is assembled with the cap part 3 by precise positioning due to the first fitting structure 8. This eliminates the need for fixing the metal circular cylinder 2 to the cap part 3 by using a fastening part or other parts. For this reason, the production man-hours can be reduced, and accordingly the production costs can be reduced. In addition, hydrogen degradation of the fastening part in a case where the metal circular cylinder 2 is fixed to the cap part 3 by using the fastening part or other parts can be eliminated. Further, since the metal circular cylinder 2 and the cap part 3 are fixed in position by the first fitting structure 8, the metal circular cylinder 2 does not contact the outer cylinder 4, and thus the gap 6 with a circular-cylindrical shape is not closed.

According to Embodiment, the first O-ring 9a and the second O-ring 9b that are sealing parts are provided between the metal circular cylinder 2 and the cap part 3 on the inner-diameter side relative to the first fitting structure 8.

With this configuration, the sealing performance in the section of the first fitting structure 8 is insufficient since the gap between the metal circular cylinder 2 and the cap part 3 changes in shape in a complicated manner. The first O-ring 9a and the second O-ring 9b that are sealing parts are provided between the metal circular cylinder 2 and the cap part 3 on the inner-diameter side relative to the first fitting structure 8, so that the first O-ring 9a and the second O-ring 9b that are sealing parts seal the metal circular cylinder 2 and the cap part 3 on the inner-diameter side relative to the section with insufficient sealing performance. This can prevent high-pressure hydrogen stored in the metal circular cylinder 2 from leaking from the outer peripheral side relative to the first O-ring 9a and the second O-ring 9b that are sealing parts.

According to Embodiment, the high-pressure hydrogen tank 1 has the second fitting structure 12 to fit the outer cylinder 4 and the cap part 3 to each other.

With this configuration, the outer cylinder 4 to be fixed to the cap part 3 with the bolts 5 that are the fastening parts is assembled with the cap part 3 by precise positioning due to the second fitting structure 12. Thus, the outer cylinder 4 can be easily fixed to the cap part 3 by using the bolts 5 that are the fastening parts. This makes it easy to perform the production step of fastening with the bolts 5 that are the fastening parts, and accordingly can reduce the production costs.

According to Embodiment, the second fitting structure 12 is provided at the fastening portion of the bolt 5 that is the fastening part.

With this configuration, the outer cylinder 4 can be fastened by using the bolts 5 that are the fastening parts at a portion where the outer cylinder 4 is assembled with the cap part 3 by precise positioning due to the second fitting structure 12. This makes it easier to perform the production step of fastening with the bolts 5 that are the fastening parts, and accordingly can further reduce the production costs.

According to Embodiment, the outer cylinder 4 includes a flat lower surface.

With this configuration, the outer cylinder 4 can be installed on the installation surface below with its flat lower surface. This stabilizes the installation of the outer cylinder 4 with a flat lower surface on the installation surface.

According to Embodiment, the outer cylinder 4 is an outer square cylinder with a square-cylindrical shape.

With this configuration, the outer cylinder 4 has upper and lower surfaces parallel to each other, and opposite lateral surfaces parallel to each other, and is formed with the upper and lower surfaces perpendicular to the opposite lateral surfaces. With this configuration, the outer cylinder 4 formed into an outer square cylinder does not have any excess projecting portions on its outer peripheral surface, and therefore in an upward-downward direction and in a rightward-leftward direction relative to a single high-pressure hydrogen tank 1, another high-pressure hydrogen tank 1 with an outer square cylinder can be located adjacent to the single high-pressure hydrogen tank 1, so that a plurality of high-pressure hydrogen tanks 1 can be stacked on one another without wasting the space.

According to Embodiment, the outer cylinder 4 is an outer circular cylinder with a circular-cylindrical shape.

With this configuration, the outer cylinder 4 formed into an outer circular cylinder has a uniform resistance to pressure over the entire circumferential direction. This improves the rigidity of the outer cylinder 4 formed into an outer circular cylinder.

According to Embodiment, the high-pressure hydrogen tank 1 serves as a part of the counterweight of a transportation vehicle.

With this configuration, the weight of the high-pressure hydrogen tank 1 is increased by a double circular-cylindrical part made up of the metal circular cylinder 2 and the outer cylinder 4. Thus, the total volume of the counterweight mounted on a transportation vehicle can be reduced, and accordingly the number of components of the transportation vehicle can be reduced. This can reduce the production costs of the transportation vehicle.

REFERENCE SIGNS LIST 1 high-pressure hydrogen tank
2 metal circular cylinder
3 cap part
3a insertion hole
3b recessed portion
4 outer cylinder
4a screw hole
4b plate-like part
4c bolt
5 bolt
5a head portion
5a1 insertion hole
6 gap
7 flow path
8 first fitting structure
8a projecting portion
8b recessed portion
9a first O-ring
9b second O-ring
10 leaked-hydrogen discharge hole
11 hydrogen sensor
12 second fitting structure
12a projecting portion
12b recessed portion
100 forklift
101 vehicle body
102 loading device
103 driver's seat
104 fuel cell
105 power generation unit
106 front wheel
107 rear wheel
108 counterweight

The invention claimed is:
1. A high-pressure hydrogen tank comprising:
a metal circular cylinder configured to store high-pressure hydrogen therein;
a cap part configured to cover each of opposite end portions of the metal circular cylinder;
a hollow outer part surrounding an outer periphery of a circular-cylindrical portion of the metal circular cylinder; and a fastening part configured to fix the cap part to the hollow outer part, wherein the metal circular cylinder is made of a material selected from the group consisting of chrome molybdenum steel, nickel-chrome molybdenum steel, manganese chrome steel, manganese steel, and boron steel, on an inner peripheral surface of the metal circular cylinder, a decarburized layer has been removed, the cap part includes a leaked-hydrogen discharge hole passing through an outside of the cap part at a position facing an end surface of the metal circular cylinder, a hydrogen sensor configured to monitor a leakage of hydrogen is provided at an exit of the leaked-hydrogen discharge hole, the high-pressure hydrogen tank has a first fitting structure configured to fit the metal circular cylinder and the cap part to each other, the fitting structure comprising projecting portions formed on each opposite end surface of the metal circular cylinder, and corresponding recessed portions formed on each opposite end surface of the cap part, the projecting portions projecting in an axial direction of the high-pressure hydrogen tank from the metal circular cylinder into the respective corresponding recessed portions to prevent movement of the metal circular cylinder relative to the hollow outer part in a thickness direction of the high-pressure hydrogen tank orthogonal to the axial direction, and a sealing part is provided between the metal circular cylinder and the cap part on an inner-diameter side relative to the first fitting structure, the sealing part being located at axial end faces of the metal circular cylinder.

2. The high-pressure hydrogen tank of claim 1, wherein a bolt is used as the fastening part.

3. The high-pressure hydrogen tank of claim 2, wherein the bolt is inserted from the cap part into the hollow outer part, and the cap part is provided with a recessed portion in which a head portion of the bolt is accommodated.

4. The high-pressure hydrogen tank of claim 1, wherein between an outer periphery of the metal circular cylinder and an inner periphery of the hollow outer part, a gap is formed by which the metal circular cylinder and the hollow outer part are spaced apart from each other.

5. The high-pressure hydrogen tank of claim 4, wherein the hollow outer part is provided with a flow path passing from the gap to an outside on an outer peripheral side of the hollow outer part.

6. The high-pressure hydrogen tank of claim 1, wherein the high-pressure hydrogen tank has a second fitting structure to fit the hollow outer part and the cap part to each other.

7. The high-pressure hydrogen tank of claim 6, wherein the second fitting structure is provided at a fastening portion of the fastening part.

8. The high-pressure hydrogen tank of claim 1, wherein the hollow outer part includes a flat lower surface.

9. The high-pressure hydrogen tank of claim 1, wherein the hollow outer part has an outer square shape.

10. The high-pressure hydrogen tank of claim 1, wherein the hollow outer part is an outer circular cylinder with a circular-cylindrical shape.

11. The high-pressure hydrogen tank of claim 1, wherein the high-pressure hydrogen tank serves as a part of a counterweight of a transportation vehicle.

12. The high-pressure hydrogen tank of claim 1, wherein the recessed portions cover all exposed sides of the projection portions, the exposed sides being sides that extend beyond a top surface of the metal circular cylinder in the axial direction.

13. The high-pressure hydrogen tank of claim 1, wherein the recessed portions cover at least three sides of the projection portions.

14. The high-pressure hydrogen tank of claim 1, wherein a bottom surface of the cap part is flush with a top surface of the metal circular cylinder and does not extend inside of the cylinder in the axial direction.

* * * * *